United States Patent
Strope et al.

(10) Patent No.: US 10,783,456 B2
(45) Date of Patent: Sep. 22, 2020

(54) TRAINING ENCODER MODEL AND/OR USING TRAINED ENCODER MODEL TO DETERMINE RESPONSIVE ACTION(S) FOR NATURAL LANGUAGE INPUT

(71) Applicant: Google LLC, Mountain View, CA (US)

(72) Inventors: Brian Strope, Palo Alto, CA (US); Yun-hsuan Sung, Mountain View, CA (US); Wangqing Yuan, Wilmington, MA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/611,725

(22) PCT Filed: Dec. 14, 2018

(86) PCT No.: PCT/US2018/065727
§ 371 (c)(1),
(2) Date: Nov. 7, 2019

(87) PCT Pub. No.: WO2019/118864
PCT Pub. Date: Jun. 20, 2019

(65) Prior Publication Data
US 2020/0104746 A1 Apr. 2, 2020

Related U.S. Application Data

(60) Provisional application No. 62/599,550, filed on Dec. 15, 2017.

(51) Int. Cl.
*G06N 20/00* (2019.01)
*G06F 16/35* (2019.01)
(Continued)

(52) U.S. Cl.
CPC ......... *G06N 20/00* (2019.01); *G06F 16/3329* (2019.01); *G06F 16/3344* (2019.01);
(Continued)

(58) Field of Classification Search
CPC .......... G06N 20/00; G06N 5/04; G06F 16/35; G06F 16/3329; G06F 16/3344;
(Continued)

(56) References Cited

U.S. PATENT DOCUMENTS 10,170,107 B1 * 1/2019 Dreyer ................... G06N 3/084
10,388,274 B1 * 8/2019 Hoffmeister ......... G06N 3/0445
(Continued)

FOREIGN PATENT DOCUMENTS

WO 2018226960 12/2018

OTHER PUBLICATIONS

Ye et al., Learning Question Similarity with Recurrent Neural Networks, 2017 IEEE International Conference on Big Knowledge. (Year: 2017).*
(Continued)

*Primary Examiner* — Dave Misir
(74) *Attorney, Agent, or Firm* — Middleton Reutlinger

(57) ABSTRACT

Systems, methods, and computer readable media related to: training an encoder model that can be utilized to determine semantic similarity of a natural language textual string to each of one or more additional natural language textual strings (directly and/or indirectly); and/or using a trained encoder model to determine one or more responsive actions to perform in response to a natural language query. The encoder model is a machine learning model, such as a neural network model. In some implementations of training the encoder model, the encoder model is trained as part of a larger network architecture trained based on one or more
(Continued)

tasks that are distinct from a "semantic textual similarity" task for which the encoder model can be used.

15 Claims, 9 Drawing Sheets

(51) Int. Cl.
   *G06F 16/332* (2019.01)
   *G06F 16/33* (2019.01)
   *G06N 5/04* (2006.01)

(52) U.S. Cl.
   CPC .......... *G06F 16/3346* (2019.01); *G06F 16/35* (2019.01); *G06N 5/04* (2013.01)

(58) Field of Classification Search
   CPC .... G06F 16/3346; G06F 17/279; G06F 40/30; G10L 15/1822; G10L 15/22
   USPC .......................................................... 706/12
   See application file for complete search history.

(56) References Cited

U.S. PATENT DOCUMENTS

| | | | |
|---|---|---|---|
| 2002/0129015 | A1 | 9/2002 | Caudill et al. |
| 2010/0235341 | A1* | 9/2010 | Bennett .............. G06F 16/3344 707/706 |
| 2015/0074027 | A1 | 3/2015 | Huang et al. |
| 2015/0293976 | A1 | 10/2015 | Guo et al. |
| 2019/0005021 | A1* | 1/2019 | Miller ..................... G10L 15/26 |

OTHER PUBLICATIONS

European Patent Office; Invitation to Pay Additional Fees; Application No. PCT/US2018/065727; 12 pages; dated Mar. 29, 2019.
European Patent Office; Intention to Grant for European Application No. 18830624.5; dated Dec. 18, 2019.
Zhou, X. et al., "An Auto-Encoder for Learning Conversation Representation Using LSTM"; Proc. Int. Conf. Adv. Biometrics (ICB); [Lecture Notes in Computer Science]; pp. 310-317; Nov. 12, 2015.
European Patent Office; International Search Report and Written Opinion of Ser. No. PCT/US2018/065727; 15 pages; dated May 21, 2019.
Agirre, E. et al. "SemEval—2012 Task 6: A Pilot on Semantic Textual Similarity." In Proceedings of the First Joint Conference on Lexical and Computational Semantics—vol. 1: Proceedings of the main conference and the shared task, and vol. 2: Proceedings of the Sixth International Workshop on Semantic Evaluation, pp. 385-393. Association for Computational Linguistics; Jun. 7, 2012.
Al-Rfou, R. et al. "Conversational Contextual Cues: The Case of Personalization and History for Response Ranking." Cornell University; www.arXiv.org; arXiv:1606.00372; 10 pages; Jun. 1, 2016.
Arora, S. et al. "A Simple But Tough-To-Beat Baseline for Sentence Embeddings." In 5th International Conference on Learning Representations (ICLR); 16 pages; Nov. 4, 2016.
Bär, D. et al. "UKP: Computing Semantic Textual Similarity by Combining Multiple Content Similarity Measures." In Proceedings of the First Joint Conference on Lexical and Computational Semantics—vol. 1: Proceedings of the main conference and the shared task, and vol. 2: Proceedings of the Sixth International Workshop on Semantic Evaluation, pp. 435-440. Association for Computational Linguistics; Jun. 7, 2012.
Bowman, S. et al. "A Large Annotated Corpus for Learning Natural Language Inference." In Proceedings of the 2015 Conference on Empirical Methods in Natural Language Processing (EMNLP). Association for Computational Linguistics; https://www.aclweb.org/anthology/D15-1075.pdf; 11 pages; Sep. 2015.
Cer, D. "SemEval—2017 Task 1: Semantic Textual Similarity-Multilingual and Cross-Lingual Focused Evaluation." Proceedings of the 11th International Workshop on Semantic Evaluation (SemEval 2017); https://www.aclweb.org/anthology/S17-2001.pdf ; 14 pages; Aug. 3, 2017.
Charlet, D. et al. "SimBow at SemEval—2017 Task 3: Soft-Cosine Semantic Similarity Between Questions for Community Question Answering." In Proceedings of the 11th International Workshop on Semantic Evaluation (SemEval—2017), https://www.aclweb.org/anthology/S17-2051.pdf; pp. 315-319; Aug. 2017.
Chen, Q. et al. "Natural Language Inference With External Knowledge." Cornell University; www.arXiv.org; arXiv preprint arXiv:1711.04289; 11 pages; Nov. 16, 2017.
Conneau, A. "Supervised Learning of Universal Sentence Representations From Natural Language Inference Data." In Proceedings of the 2017 Conference on Empirical Methods in Natural Language Processing, 11 pages, Copenhagen, Denmark. Association for Computational Linguistics; https://www.aclweb.org/anthology/D17-1070.pdf; Sep. 7, 2017.
Filice, S. et al. "KeLP at SemEval-2017 Task 3: Learning Pairwise Patterns in Community Question Answering." In Proceedings of the 11th International Workshop on Semantic Evaluation (SemEval—2017), https://www.aclweb.org/anthology/S17-2053.pdf; pp. 326-333; Aug. 2017.
Henderson, M. et al. "Efficient Natural Language Response Suggestion for Smart Reply." Cornell University; arXiv.org; arXiv:1705.00652; 15 pages; May 1, 2017.
Iyyer, M. et al. "Deep Unordered Composition Rivals Syntactic Methods for Text Classification." In Proceedings of the 53rd Annual Meeting of the Association for Computational Linguistics and the 7th International Joint Conference on Natural Language Processing (vol. 1: Long Papers), pp. 1681-1691, Beijing, China. Association for Computational Linguistics; https://www.aclweb.org/anthology/P15-1162.pdf; Jul. 2015.
Jimenez, S. et al. "Soft Cardinality: A Parameterized Similarity Function for Text Comparison." In Proceedings of the First Joint Conference on Lexical and Computational Semantics—vol. 1: Proceedings of the main conference and the shared task, and vol. 2: Proceedings of the Sixth International Workshop on Semantic Evaluation, pp. 449-453. Association for Computational Linguistics. Jun. 2012.
Kannan, A. et al. "Smart Reply: Automated Response Suggestion for Email." In Proceedings of the ACM SIGKDD International Conference on Knowledge Discovery and Data Mining; pp. 955-964; Aug. 2016.
Kiros, R. et al. "Skip-Thought Vectors." Proceedings of the 28th International Conference on Neural Information Processing Systems; 9 pages; Dec. 2015.
Kruszewski, G. et al. "Jointly Optimizing Word Representations for Lexical and Sentential Tasks With The C-Phrase Model." In Proceedings of the 53rd Annual Meeting of the Association for Computational Linguistics and the 7th International Joint Conference on Natural Language Processing (vol. 1: Long Papers), vol. 1, https://www.aclweb.org/anthology/P15-1094.pdf; pp. 971-981; Jul. 2015.
Lau, J. et al. "An Empirical Evaluation of Doc2Vec With Practical Insights Into Document Embedding Generation." In Processings of ACL Workshop on Representation Learning for NLP, https://www.aclweb.org/anthology/W16-1609.pdf; pp. 78-86; Aug. 2016.
Nakov, P. et al. "SemEval—2017 Task 3: Community Question Answering." In Proceedings of the 11th International Workshop on Semantic Evaluation, SemEval '17, Vancouver, Canada. Association for Computational Linguistics; https://www.aclweb.org/anthology/S16-1083.pdf; 22 pages; Jun. 2016.
Pagliardini, M. "Unsupervised Learning of Sentence Embeddings Using Compositional n-Gram Features." Cornell University, arXiv.org; arXiv preprint arXiv:1703.02507; 9 pages; Mar. 7, 2017.
Shao, Y. "HCTI at SemEval—2017 Task 1: Use Convolutional Neural Network to Evaluate Semantic Textual Similarity." In Proceedings of the 11th International Workshop on Semantic Evaluation (SemEval—2017), https://www.aclweb.org/anthology/S17-2016.pdf; pp. 130-133; Aug. 2017.
Tai, K. et al. "Improved Semantic Representations From Tree-Structured Long Short-Term Memory Networks." Cornell University; arXiv.org; arXiv preprint arXiv:1503.00075v3; 11 pages; May 30, 2015.

(56) References Cited

OTHER PUBLICATIONS

Tian et al. "ECNU at SemEval—2017 Task 1: Leverage Kernel-Based Traditional NLP Features and Neural Networks to Build a Universal Model for Multilingual and Cross-Lingual Semantic Textual Similarity." In Proceedings of the 11th International Workshop on Semantic Evaluation (SemEval—2017), https://www.aclweb.org/anthology/S17-2028.pdf; pp. 191-197; Aug. 2017.

Vaswani, A. et al. "Attention Is All You Need." Advances in Neural Information Processing Systems 30 (NIPS 2017), 11 pages; 2017.

Williams, A. et al. "Learning to Parse From a Semantic Objective: It Works. Is It Syntax?" Cornell University; arXiv.org; arXiv preprint arXiv:1709.01121; 13 pages; Sep. 4, 2017.

Wu, H. "BIT at SemEval—2017 Task 1: Using Semantic Information Space to Evaluate Semantic Textual Similarity." In Proceedings of the 11th International Workshop on Semantic Evaluation (SemEval—2017), https://www.aclweb.org/anthology/S17-2007.pdf; pp. 77-84; Aug. 2017.

European Patent Office; Communication issue in Application No. 20169141.7; 7 pages; dated Jun. 5, 2020.

\* cited by examiner

TRAINING ENCODER MODEL AND/OR USING TRAINED ENCODER MODEL TO DETERMINE RESPONSIVE ACTION(S) FOR NATURAL LANGUAGE INPUT

BACKGROUND

Users interface with various applications utilizing free-form natural language input. For example, users can engage in human-to-computer dialogs with interactive software applications referred to herein as "automated assistants" (also referred to as "chatbots," "interactive personal assistants," "intelligent personal assistants," "personal voice assistants," "conversational agents," etc.). For instance, humans (which when they interact with automated assistants may be referred to as "users") may provide commands, queries, and/or requests (collectively referred to herein as "queries") using free-form natural language input, which may be vocal utterances converted into text and then processed, and/or by typed free-form natural language input.

Many automated assistants and other applications are configured to perform one or more responsive actions in response to various queries. For example, in response to a natural language query of "how are you", an automated assistant can be configured to respond to the query with graphical and/or audible output of "great, thanks for asking". As another example, in response to a query of "what's the weather for tomorrow", an automated assistant can be configured to interface (e.g., via an API) with a weather agent (e.g., a third party agent) to determine a "local" weather forecast for tomorrow, and to respond to the query with graphical and/or audible output that conveys such weather forecast. As yet another example, in response to a user query of "play music videos on my TV", an automated assistant can be configured to cause music videos to be streamed at a networked television of the user.

However, in response to various queries that seek performance of an action performable by an automated assistant, many automated assistants can fail to perform the action. For example, an automated assistant can be configured to cause music videos to be streamed at a networked television of the user in response to a query of "play music videos on my TV", but may fail to perform such an action in response to various other queries such as "make some videos of the music variety appear on the tube"—despite such other queries seeking performance of the same action. Accordingly, the automated assistant will not perform the action intended by the query, and may instead provide a generic error response (e.g., "I don't know how to do that") or no response at all. This can cause the user to have to provide another query in another attempt to cause the automated assistant to perform the action. This wastes various resources, such as resources required to process the query (e.g., voice-to-text processing) and/or to transmit the query (e.g., when component(s) of the automated assistant are located on device(s) remote from a client device via which the query was provided).

SUMMARY

Implementations of this specification are directed to systems, methods, and computer readable media related to: training an encoder model that can be utilized to determine semantic similarity of a natural language textual string to each of one or more additional natural language textual strings (directly and/or indirectly); and/or using a trained encoder model to determine one or more responsive actions to perform in response to a natural language query. The encoder model is a machine learning model, such as a neural network model.

For example, some implementations process, using a trained encoder model, a free-form natural language input directed to an automated assistant. Processing the free-form natural language input using the trained encoder model generates an encoding of the free-form natural language input, such as an encoding that is a vector of values. The encoding is then compared to pre-determined encodings that each have one or more automated assistant action(s) mapped thereto (directly and/or indirectly mapped). The automated assistant action(s) mapped to a pre-determined encoding can include, for example, providing a particular response for audible and/or graphical presentation, providing a particular type of response for audible and/or graphical presentation, interfacing with a third party agent, interfacing with an Internet of things (IoT) device, determining one or more values (e.g., "slot values") for inclusion in a command to an agent and/or an IoT device, etc. The pre-determined encodings can each be an encoding of a corresponding textual segment that has been assigned to corresponding automated assistant action(s). Further, each of the pre-determined encodings can be generated based on processing of a corresponding textual segment using the trained encoder model. Moreover, a pre-determined encoding is mapped to corresponding automated assistant action(s) based on the corresponding automated assistant action(s) being action(s) assigned to the textual segment on which the pre-determined encoding is generated. As one example, a pre-determined encoding can be generated based on processing of "how are you" using the trained encoder model, and can be mapped to the automated assistant action of providing a response of "great, thanks for asking", based on that response being assigned to the textual segment "how are you" (e.g., previously manually assigned by a programmer of the automated assistant).

The comparisons (of the encoding of the free-form natural language input to the pre-determined encodings) can be utilized to determine one or more pre-determined encodings that are "closest" to the encoding. The action(s) mapped to the one or more "closest" pre-determined encodings can then be performed by the automated assistant, optionally contingent on the "closest" pre-determined encodings being "close enough" (e.g., satisfying a distance threshold). As one example, each encoding can be a vector of values and the comparison of two encodings can be a dot product of the vectors, which results in a scalar value that indicates distance between the two vectors (e.g., the scalar value can be from 0 to 1, where the magnitude of the scalar value indicates the distance)—and that indicates the semantic similarity of the two textual segments based on which encodings were generated.

As one particular example, a programmer can explicitly assign the automated assistant action of "causing music videos to be streamed at a television" to be assigned to the textual segment "play music videos on my TV", but may not explicitly assign that action (or any action) to the textual segment "make some videos of the music variety appear on the tube". The textual segment "play music videos on my TV" can be processed using the trained encoder model to generate an encoding of the textual segment, and the encoding can be stored with a mapping of the automated assistant action of "causing music videos to be streamed at a television". Thereafter, the free-form natural language input "make some videos of the music variety appear on the tube" can be directed to the automated assistant based on user interface input from a user. The input "make some videos of the music variety appear on the tube" can be processed using the trained encoder model to generate an encoding, and that encoding compared to pre-determined encodings, including the pre-determined encoding of "play music videos on my TV". Based on the comparison, it can be determined that the pre-determined encoding of "play music on my TV" is closest to the encoding of "make some videos of the music variety appear on the tube", and satisfies a closeness threshold. In response, the automated assistant can perform the action mapped to the pre-determined encoding.

In these and other manners, the automated assistant robustly and accurately responds to various natural language inputs by performing appropriate automated assistant actions, even when the automated assistant actions are not explicitly directly mapped to the natural language inputs. This results in an improved automated assistant. Additionally, generating the encoding of "make some music videos of the music variety appear on the tube" is efficient from a computational resource standpoint, as is the comparison of the encoding to the pre-determined encodings (as a simple dot product and/or other comparison(s) can be utilized). Further, Maximum Inner Product Search and/or other techniques can be utilized to further improve efficiency. This results in the automated assistant performing responsive action(s) more quickly (relative to other techniques) and/or determining responsive action(s) to perform using less computational resources (relative to other techniques). Moreover, storing mappings of encodings to automated assistant actions can be more storage space efficient than storing mappings of full textual segments to automated assistant actions. Additionally, fewer mappings to automated assistant actions can be provided as a single pre-determined encoding can semantically represent (distance wise) multiple semantically similar textual segments, without the need to map each of those textual segments to the automated assistant actions. Furthermore, where the automated assistant receives queries as a voice input, resources required to process the voice input to determine the query (e.g., voice-to-text processing) can be reduced, as appropriate automated assistant actions can be performed without a failed query response requiring the user inputting another query in an attempt to get the desired result. Similarly, where the query is processed by a system remote from the automated assistant (e.g., when component(s) of the automated assistant are located on device(s) remote from a client device via which the query was provided), resources required to transmit the query and receive a suitable response can be reduced, as appropriate automated assistant actions can be performed without the another query having to be transmitted in an attempt to get the same result. In this way, the use of network resources can be reduced.

Implementations of this specification are additionally and/or alternatively directed to various techniques for training an encoder model. The encoder model is a machine learning model, such as a neural network model. Various encoder model architectures can be utilized, such as a feed-forward neural network model, a recurrent neural network model (i.e., that includes one or more recurrent layers such as long short-term memory (LSTM) layers and/or gated recurrent unit (GRU) layers), a recurrent and convolutional neural network model (i.e., that includes one or more convolutional layers and one or more recurrent layers), and/or a transformer encoder.

In some implementations of training the encoder model, the encoder model is trained as part of a larger network architecture trained based on one or more tasks that are distinct from the "semantic textual similarity" task for which the encoder model can be used (e.g., the semantic similarity task described above with respect to the automated assistant examples). In some of those implementations, the encoder model is trained as part of a larger network architecture trained to enable prediction of whether a textual response is a true response to a textual input. As one working example, training instances can be utilized that each include training instance input that includes: input features of a textual input, and response features of a textual response. The training instances each further include training instance output that indicates whether the textual response of the corresponding training instance input is an actual response for the textual input of the training instance input. For positive training instances, the textual response is utilized based on it being indicated as actually being a "response" to the textual input in a conversational resource. For example, the textual input may be an earlier in time email, text message, chat message, social networking message, Internet comment (e.g., a comment from an Internet discussion platform), etc. of a first user—and the response may be all or portions of a responsive email, text message, chat message, social networking message, internet comment, etc. of an additional user. For instance, the textual input can be an Internet comment and the response can be a reply to the Internet comment.

During training, and continuing with the working example, the input features of training instance input of a training instance are applied as input to the encoder model (without application of the response features of the training instance input) and an input encoding is generated based on processing that input using the encoder model. Further, the response features of the training instance input are applied as input to the encoder model (without application of the input features of the training instance input) and a response encoding is generated based on processing that input using the encoder model. The response encoding is further processed using a reasoning model to generate a final response encoding. The reasoning model can be a machine learning model, such as a feed-forward neural network model. A response score is then determined based on comparison of the input encoding and the final response encoding. For example, the response score can be based on the dot product of the input vector and the response vector. For instance, the dot product can result in a value from 0 to 1, with "1" indicating the highest likelihood a corresponding response is an appropriate response to a corresponding electronic communication and "0" indicating the lowest likelihood. Both the reasoning model and the encoder model can then be updated based on comparison of: the response score (and optionally additional response scores in batch techniques described herein); and a response score indicated by the training instance (e.g., a "1" or other "positive" response score for a positive training instance, a "0" or other "negative" response score for a negative training instance). For example, an error can be determined based on a difference between the response score and the indicated response score, and the error backpropagated over both the reasoning model and the encoder model.

Through such training, the encoder model is trained to be utilized independently (i.e., without the reasoning model) to derive a corresponding encoding that provides a robust and accurate semantic representation of a corresponding input. Also, through training on positive instances, each based on textual inputs and actual responses, and negative instances, each based on textual inputs and textual responses that are not actual responses, the semantic representation of the corresponding input is based at least in part on learned differences between: textual inputs and actual textual responses; and textual inputs and textual responses that are not actual responses. Further, training instances that are based on textual inputs and textual responses can be efficiently generated in an unsupervised manner as described herein, and a large quantity of diverse training instances can be generated from one or more corpora, such as publicly available Internet comments as described herein. Utilization of such large quantity of unsupervised and diverse training instances can result in a robust encoder model that generalizes to many diverse textual segments.

After training, the encoder model can be utilized independently (i.e., without the reasoning model) to determine the semantic similarity between two textual strings (the semantic textual similarity task). For example, a first encoding of a first textual string can be generated based on processing of the first textual string utilizing the trained encoder model, and a second encoding of a second textual string can be generated based on processing of the second textual string utilizing the trained encoder model. Further, the two encodings can be compared to determine a score that indicates a degree of semantic similarity between the first and second textual strings. For example, the score can be based on the dot product of the first encoding and the second encoding. For instance, the dot product can result in a value from 0 to 1, with "1" indicating the highest degree of similarity and "0" indicating the lowest degree of similarity (and the highest degree of dissimilarity).

Such a score can be used for various purposes. For example, such a score can be used for various automated assistant purposes, such as those described above. As another example, such a score can be used by a search engine to determine one or more textual queries that are semantically similar to a received textual query. Moreover, since the score, indicative of similarity between two textual segments, is based on comparison of corresponding encodings for the two textual segments, the trained encoder model can be used to pre-determine encodings for various textual segments (e.g., those explicitly assigned to corresponding responsive action(s), such as corresponding automated assistant action(s)), and those pre-determined encodings stored (e.g., along with a mapping to their corresponding responsive action(s)). The similarity of an inputted natural language query to a given textual segment can thus be determined by processing the natural language query using the trained encoder model to generate an encoding, then comparing the generated encoding to a pre-stored encoding of the given textual segment. This obviates the need for a run-time determination of the pre-stored encoding, conserving various computational resources at run-time and/or reducing latency in generating a response at run-time. Further, at run-time, the encoding of a natural language input query input vector is determined based on processing of the query utilizing the trained encoder model, and the same encoding of the natural language query can be compared to multiple pre-determined encodings. This enables determination of an encoding through a single call of an encoder model at run-time, and usage of that encoding in comparison to each of multiple pre-determined encodings.

In some implementations of training the encoder model, the encoder model is trained as part of a larger network architecture trained based on multiple tasks that are distinct from the "semantic textual similarity" task for which the encoder model can be used. In some of those implementations, the encoder model is trained based on a task of predicting whether a textual response is a true response to a textual input (e.g., as described above) and is trained based on at least one additional task that is also distinct from the semantic textual similarity task. In those implementations, the encoder model is utilized and updated in the training for each task, but different additional components of the larger network architecture are utilized and updated for each task. For example, the reasoning model described above can be utilized for the task of predicting whether a textual response is a true response, and determined errors for that task utilized to update the reasoning model and the encoder model during training. Also, for example, for an additional task, an additional model can be utilized, and determined errors for that additional task utilized to update that additional model and the encoder model during training.

In various implementations where the encoder model is trained based on multiple tasks that are distinct from the "semantic textual similarity" task, the encoder model is trained on the multiple tasks at the same time. In other words, the encoder model is not first trained on a first task, then trained on a second task after completion of being trained on the first task, etc. Rather, one or more updates (e.g., through one or more backpropagations of error) of weights of the encoder model can be based on a first task, then one or more updates of weights of the encoder model can be based on a second task, then one or more updates of weights of the encoder model can be based on the first task, then one or more updates of weights of the encoder model can be based on the second task, etc. In some of those various implementations, independent workers (computer jobs) can be utilized in training, and each worker can train on only a corresponding task, utilizing batches of training instances for the corresponding task. Different quantities of workers can be devoted to the tasks, thereby adjusting the impact of each task in training of the encoder model. As one example, 95% of workers can train on the predicting whether a textual response is a true response task, and 5% of workers can train on an additional task.

Various additional tasks can be utilized and can utilize various additional network architecture components that are in addition to the encoder model. One example of an additional task is a natural language inference task that can be trained using supervised training instances, such as supervised training instances from the Stanford Natural language Inference (SNLI) dataset. Such training instances each include a pair of textual segments as training instance input, along with training instance output that is a human label of one of multiple categories for the pair of textual segments (e.g., categories of: entailment, contradiction, and neutral). Additional network architecture components that can be utilized for the natural language inference task can include a feed-forward neural network model, such as a model with fully-connected layers and a softmax layer.

In training for the natural language inference task, a first textual segment of training instance input of a training instance is applied as input to the encoder model (without application of the second textual segment of the training instance input) and a first encoding is generated based on processing that input using the encoder model. Further, the second textual segment of the training instance input is applied as input to the encoder model (without application of the first textual segment of the training instance input) and a second encoding is generated based on processing that input using the encoder model. A feature vector can be generated based on the first and second encodings, such as a feature vector of $(u_1, u_2, |u_1-u_2|, u_1*u_2)$, where $u_1$ represents the first encoding and $u_2$ represents the second encoding. The feature vector can be processed using the feed-forward neural network model for the natural language inference task to generate a prediction for each of the multiple categories (e.g., categories of: entailment, contradiction, and neutral). The prediction and the labeled category of the training instance output of the training instance can be compared, and both the feed-forward neural network model for the natural language inference task updated based on the comparison (and optionally additional comparisons for the natural language inference task in batch techniques described herein). For example, an error can be determined based on the comparison(s), and backpropagated over both of the models.

Various implementations disclosed herein may include one or more non-transitory computer readable storage media storing instructions executable by a processor (e.g., a central processing unit (CPU), graphics processing unit (GPU), and/or Tensor Processing Unit (TPU)) to perform a method such as one or more of the methods described herein. Yet other various implementations may include a system of one or more computers that include one or more processors operable to execute stored instructions to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
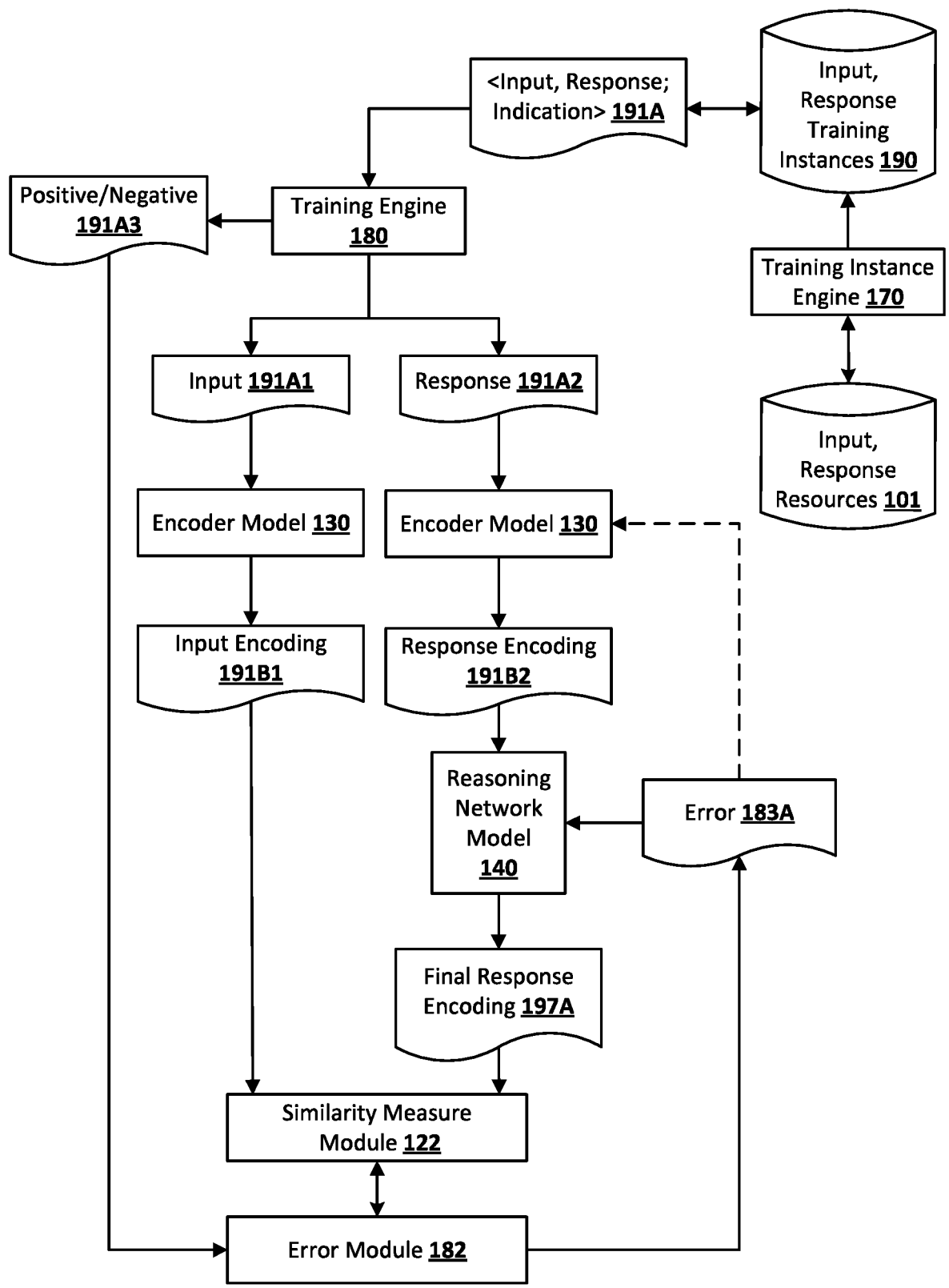
FIG. 1 illustrates an example of training an encoder model according to some implementations disclosed herein.

Semantic Textual Similarity (STS) is a task to measure the similarity or equivalence of two snippets of text. Accurately measuring similarity in meaning is a fundamental language understanding problem, with applications to many natural language processing (NLP) challenges including machine translation, summarization, question answering, and semantic search.

Implementations disclosed herein relate to training an encoder model and/or utilizing the trained encoder model to generate embeddings (also referred to herein as encodings) for textual segments. Further, implementations relate to comparing a given embedding of a given textual segment to embeddings of additional textual segments to determine one or more embeddings that are closest to the given embedding. In some of those implementations, the given textual segment is a query, the embedding that is closest to the given embedding is mapped to one or more responsive actions, and the responsive action(s) are performed in response to the query based on the given embedding being closest to the embedding that is mapped to the responsive action(s).

In various implementations, the encoder model is trained as part of a larger network architecture trained based on one or more tasks that are distinct from the "semantic textual similarity" task for which the encoder model can be used (e.g., the semantic similarity task described above with respect to the automated assistant examples). In some of those implementations, the encoder model is trained as part of a larger network architecture trained to enable prediction of whether a textual response is a true response to a textual input. Such training can utilize training instances that include training instance input that includes: input features of a textual input, and response features of a textual response. The textual inputs and responses can be determined in an unsupervised manner from one or more conversation corpuses. As one non-limiting example, training instance can be determined based on structured conversational data from one or more Internet discussion platforms corpora. Such a corpus can contain millions of posts and billions of comments, along with metadata about the author of the comment and the previous comment which the comment replied to. A "comment A" from the corpus is called a child of "comment B" from the corpus if comment A replied to comment B. Comments and their children can be extracted from the corpus to form textual input, textual response pairs for positive training instances. One or more rules can optionally be applied to filter out certain comments from training instances. For example, a comment can be excluded if it satisfies one or more of the following conditions: number of characters a threshold (e.g., 350), percentage of alphabetic characters a threshold (e.g., 70%), starts with "https", "/r/", or "@", and/or the author's name contains "bot" and/or other term(s). Even applying these filters and/or other filters, millions of input, response pairs can be determined from such a corpus, and utilized in generating positive training instances.

In training the encoder model as part of a larger network architecture trained to enable prediction of whether a textual response is a true response to a textual input, the task of determining whether a textual response is a true response to a textual input can be modeled as P(y|x), to rank all possible textual responses (y) given a textual input (x). More formally:

$$P(y|x) = \frac{P(x, y)}{\sum_k P(x, y_k)}$$

It is intractable to calculate the probability of textual response y against all other textual responses as the total number of textual responses is too large. Accordingly, the probability can be approximated by calculating the probability against randomly sampled K−1 responses—and the equation above can be written as:

$$P(y|x) \approx \frac{P(x, y)}{\sum_{k=1}^{K} P(x, y_k)}$$

The larger network architecture (including the encoder model) can be trained to estimate the joint probability of all possible textual input, textual response pairs P(x, y). Discriminative training can be utilized, which uses a softmax function to maximize the probability of the true response y. Accordingly, it can be expressed as $P(x, y) \propto e^{S(x,y)}$, where S(x, y) is the scoring function learned by the neural network. The final training objective can be expressed as:

$$\mathcal{J}(x, y) = -\frac{1}{K} \sum_{i=1}^{K} \left( S(x_i, y_i) - \log \sum_{j=1}^{K} e^{S(x_i, y_j)} \right)$$

In training an encoder model as part of a larger network architecture trained to enable prediction of whether a textual response is a true response to a textual input, the goal is to train the encoder model such that it can be utilized to generate a general textual embedding of a textual segment. Since the goal is to learn a general textual embedding, and training instances each include a training instance input with both textual input and a textual response, the textual input and the textual response of a training instance input are both (but separately) processed using the same encoder model to generate an encoding vector u for the textual input and an encoding vector v for the textual response. Next, the encoding vector v for the textual response is further fed into a feed-forward neural network (reasoning model) to get a final response vector v'. After the input and response are encoded, the dot-product $u^T v'$ is used to get the final score. During training, for a training batch of K input-response pairs, the input is paired with all responses in the same batch and fed into the scoring model and the training objective above is used to maximize the probability of the true response.

Turning now to FIG. 1, an example of training an encoder model 130 is provided, where the encoder model 130 is trained as part of a larger network architecture (that also includes reasoning network model 140) trained to enable prediction of whether a textual response is a true response to a textual input.

FIG. 1 includes input, response resources 101. The input, response resources 101 can include one or more conversational resources, such as threads in Internet discussion platform(s), chat messages, social networking messages, etc. The training instance engine 170 utilizes the input, response resources 101 to automatically generate input, response training instances 190. Each of the input, response training instances 190 includes training instance input that includes: input features of a textual input determined from the resources 101, and response features of a textual response determined from the resources 101. Each of the input, response training instances 190 further includes training instance output that indicates whether the textual response of the corresponding training instance input is an actual response for the textual input of the training instance input. For positive training instances, the textual response is utilized based on it being indicated as actually being a "response" to the textual input in a conversational resource.

In some implementations, the training instance engine 170 generates and stores only positive training instances. In some of those implementations, negative training instances are generated at training time based on a batch of positive training instances being utilized to train. For example, six negative training instances can be generated based on a batch of three positive training instances. For instance, two negative training instances can be generated based on pairing the input textual segment (of the training instance input) of a given training instance with the response textual segment (of the training instance input) of each of the two other training instances (under the assumption that the response textual segments of the two other training instances are not "true" responses to the input textual segment of the given textual segment). In some version of those implementations, the negative training instances are effectively generated through consideration of respective encodings generated during training, as described in more detail herein.

In FIG. 1, the training engine 180 retrieves a training instance 191A from input, response training instances 190. The training engine 180 can be implemented by one or more processors. The training instance includes input 191A1, response 191A2, and an indication. The input 191A1 can be based on a textual input determined from a conversational resource, as described herein. The input 191A1 can be the textual input itself, or a representation thereof, such as a bag of words embedding of various n-grams (e.g., unigrams, bigrams, trigrams, and/or other n-grams) of the text segment, an embedding of all or parts of the text segment based on another model, such as a GloVE embedding model and/or a Word2Vec embedding model, and/or other representation (s). The response 191A2 can be based on a textual response determined from a conversational resource, as described herein. The response 191A2 can be the textual response itself, or a representation thereof. The indication indicates whether the training instance 191A is a negative or positive training instance (i.e., whether the response 191A2 is for a response that is a true response to a communication on which the input 191A2 are based). In some implementations, the indication can be omitted. For example, the input, response training instances 190 can store only "positive" inputs and responses and a "positive" label can be assumed for training instances from input, response training instances 190.

The training engine 180 processes the input 191A1 of the training instance 191A using the encoder model 130 to generate input encoding 191B1. The training engine 180 also processes the response 191A2 of the training instance 191A using the encoder model 130 to generate response encoding 191B2. The encoder model 130 is illustrated twice in FIG. 1 to demonstrate that it is utilized twice to generate two separate encodings 191B1 and 191B2. However, it is understood that it is still only a single encoder model.

The training engine 180 processes the response encoding 191B2 using the reasoning network model 140 to generate a final response encoding 197A. The reasoning network model 140 effectively (through training) transforms response encodings into an "input" space.

The similarity measure module 122 determines a value based on comparison of the input encoding 191B1 and the final response encoding 197A. For example, the similarity measure module 122 can determine a value that is the scalar result of a dot product between the final response encoding 197A and the transpose of the input encoding 191B1.

The similarity measure module 122 provides the value to the error module 182, which can be a module of the training engine 180. The error module 182 determines an error 183A (if any) based on comparison of the value to a positive or negative indication 191A3 provided by the training engine 180 for the training instance 191A. The positive or negative indication 191A3 can be based on the indication of the training instance 191A (if any) or can be inferred as described above. For example, the indication 191A3 may be a "1" (or other value) if the training instance 191A is a positive training instance, and a "0" (or other value) if the training instance 191A is a negative training instance. The error module 182 then updates both the reasoning network model 140 and the encoder model 130 based on the error (and optionally based on other error(s) determined for a batch of training instances, when batch learning is utilized and the training instance 191A of FIG. 1 is part of the batch). For example, the error module 182 may perform, based on the error and a loss function, backpropagation over the reasoning network model 140 and the encoder model 130.

Although FIG. 1 is illustrated with respect to a single training instance, it is understood that during training a large quantity of training instances will be utilized in training.

Figure 2A:
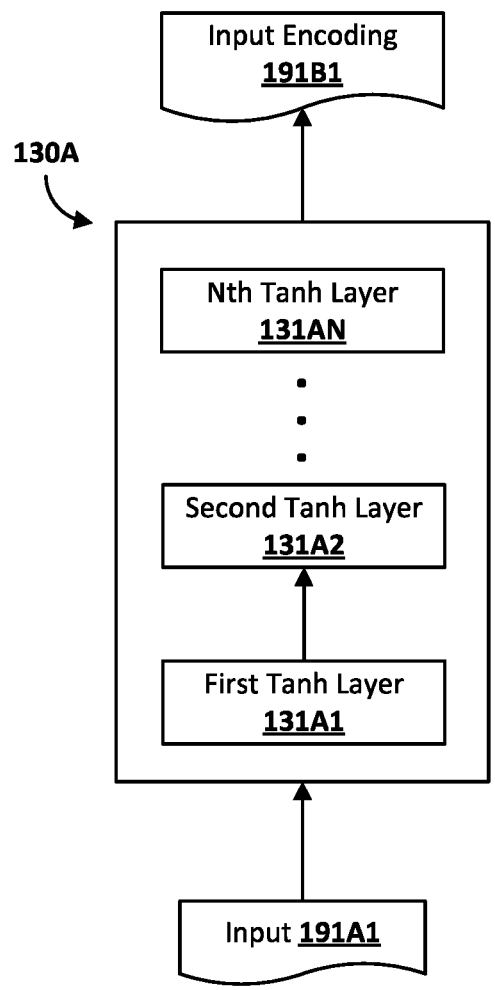
FIG. 2A illustrates an example of an encoder model according to some implementations disclosed herein.
Figure 2B:
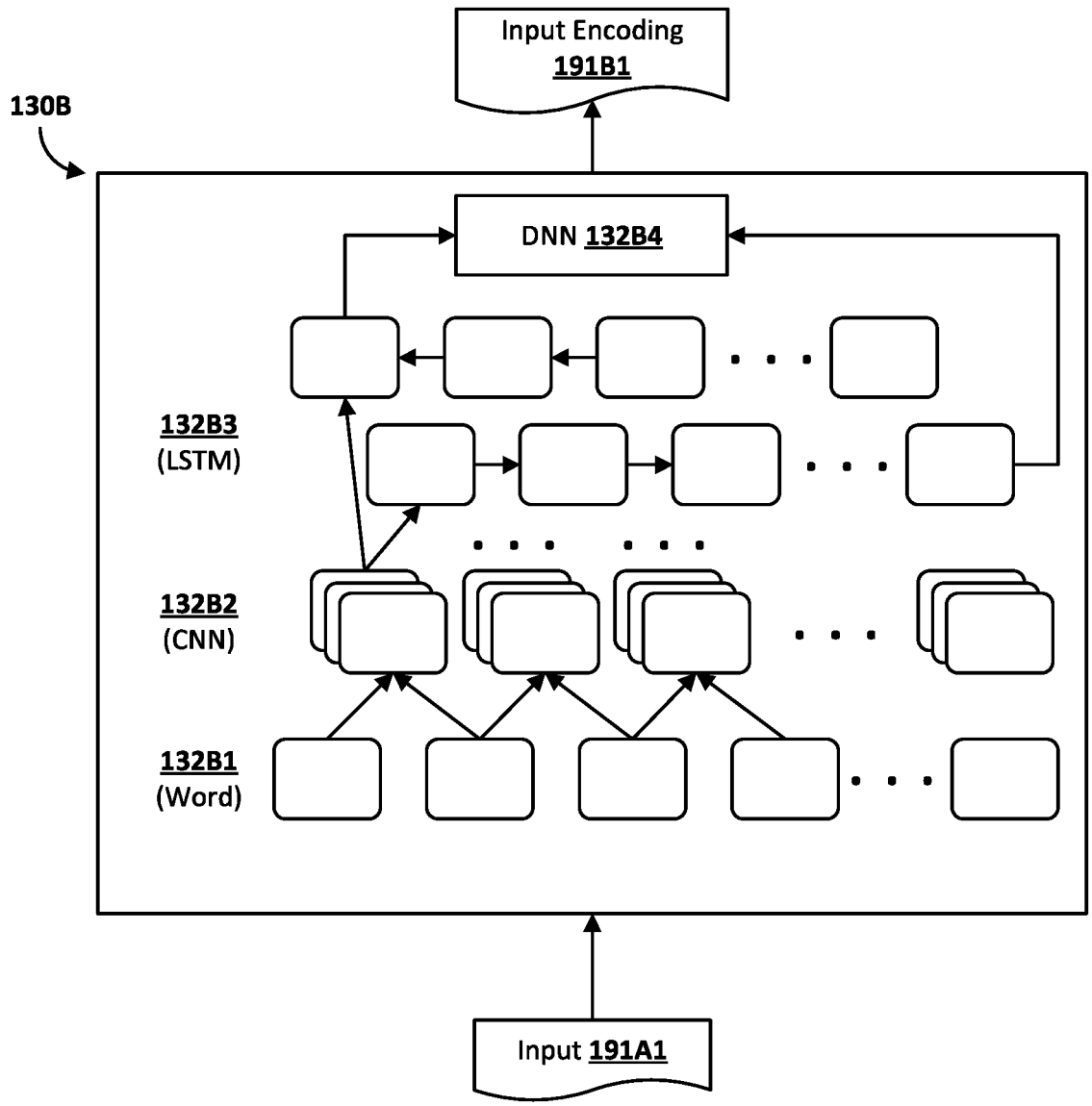
FIG. 2B illustrates another example of an encoder model according to some implementations disclosed herein.
Figure 2C:
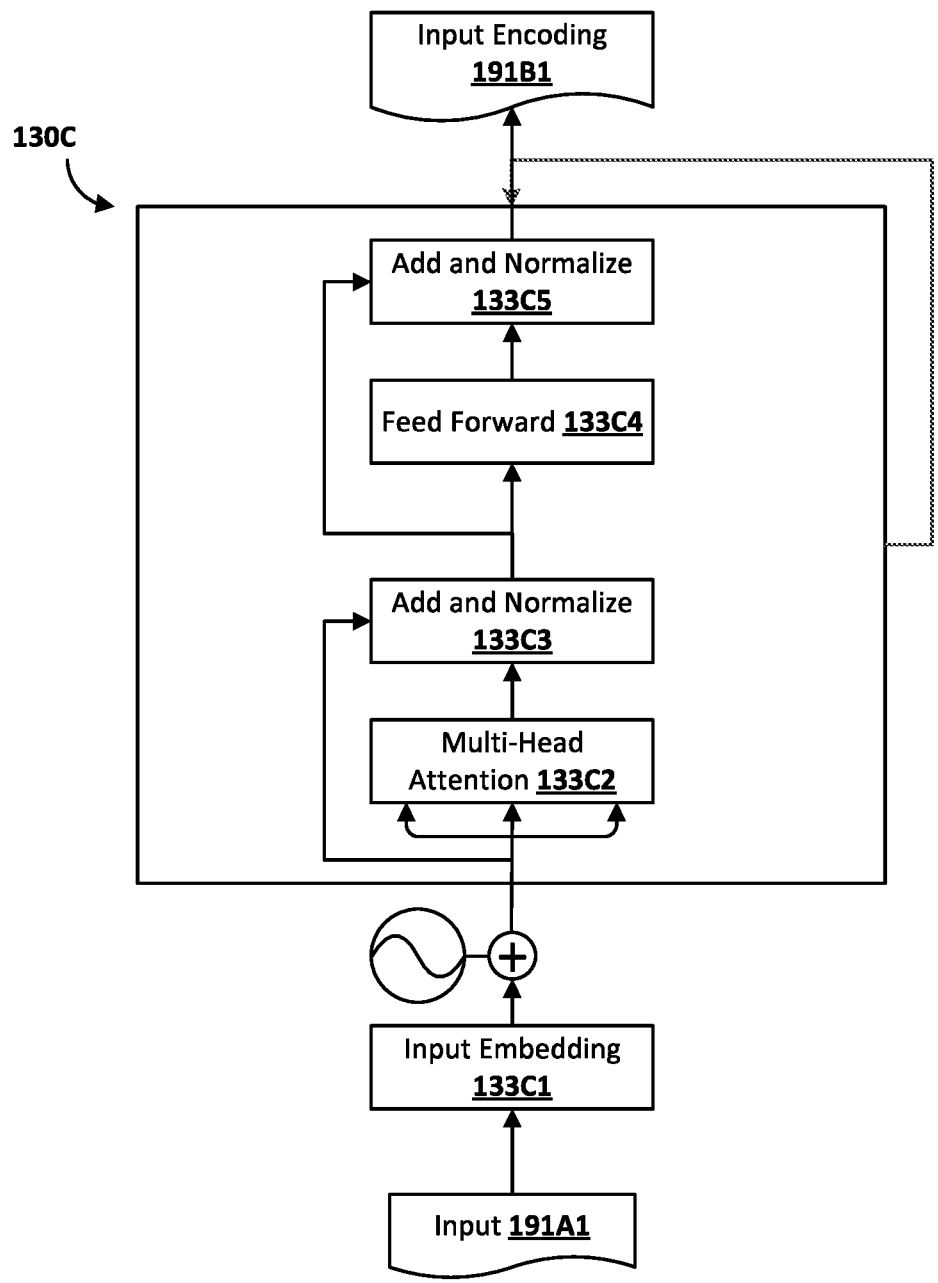
FIG. 2C illustrates yet another example of an encoder model according to some implementations disclosed herein.

Turning now to FIGS. 2A-2C, various examples of encoder model 130 are provided. Although FIGS. 2A-2C illustrate various implementations with particularity, encoder models having different architectures can be trained according to techniques described herein. For illustrative purposes, the encoder models of FIG. 2A-2C are illustrated being utilized to generate input encoding 191B1 of input 191A1. It is understood that the models can also be utilized to generate response encoding 191B2 of response 191A2, and it is understood that the different encoder models can generate differing encodings.

FIG. 2A illustrates a first encoder model 130A, which is one implementation of the encoder model 130. The first encoder model 130A is deep neural network (DNN) that is a feed-forward network with multiple Tanh layers 131A1-131AN. In some implementations, the input 191A1 applied to the first encoder model 130A can be a bag of n-grams representation. The bag of n-grams representation can be included in a training instance, or generated from a textual segment (in a training instance, or at inference). In some implementations, to build a DNN encoder with bag of n-grams, n-gram features from a large quantity of (e.g., all) conversation resources can be extracted. For each n-gram feature, a fixed-size embedding can be learned during training. Finally, embedding values can be summed at each dimension of all n-grams features in one comment and divided by the square root of the comment length. The final vector can be used as the input to the DNN encoder.

FIG. 2B illustrates a second encoder model 130B, which is another implementation of the encoder model 130. The second encoder model 130B includes a bidirectional LSTM layer 132B3 built on top of one or more convolutional neural network (CNN) layers 132B2. The second encoder model 130B also includes a word input layer 132B1, where an embedding of each n-gram of a textual segment can be applied as input. Given a sequence of words (and/or other n-grams) $(w_1, w_2, \ldots, w_t)$ in a textual segment, each word can be embedded into a vector. The convolution layer 132B2 is then used to perform convolutions over the embedded word vectors with a tanh activation function. Note that the number of filters of the convolution layer 132B2 is the same with dimension of the word embeddings. The output sequence $(\hat{w}_1, \hat{w}_2, \ldots, \hat{w}_t)$ is then processed using a bidirectional LSTM:

$$\text{Encoder} = (\overrightarrow{LSTM}(\hat{w}_1, \hat{w}_2, \ldots, \hat{w}_t), \overleftarrow{LSTM}(\hat{w}_1, \hat{w}_2, \ldots, \hat{w}_t))$$

where $\hat{w}_i$ can be thought of as an augmentation of word $w_i$ combining the neighbor's information. Finally, a single fully-connected layer 132B4 is used to convert output generated over the bidirectional LSTM layer 132B3 to a desired embedding size. The output generated over the bidirectional LSTM layer 132B3 that is used can be a last hidden state model that concatenates the last hidden state of a forward LSTM of the LSTM layer 132B3, and the last hidden state of a backward LSTM of the LSTM layer 132B3. The bidirectional LSTM layer 132B3 is a two layer stacked LSTM and the hidden unit size in each LSTM cell can be the same as word embedding size.

FIG. 2C illustrates a third encoder model 130C, which is another implementation of the encoder model 130. The third encoder model 130C is a model having a transformer architecture. Transformer architectures make heavy use of attention mechanisms, largely dispensing with recurrence and convolutions. While some transformer architectures include an encoder and decoder, only the encoder component is included in FIG. 2C. As the transformer encoder output is a variable-length sequence, it can be reduced to a fixed length by computing a flat average over all sequence positions. The third encoder model 130C includes multi-head attention 133C2, add and normalize 133C3, feed-forward 133C4, and add and normalize 133C5 components. An input embedding 133C1 of the input 191A1 can be applied as input to the third encoder model 130C.

In some implementations of training an encoder model, the encoder model is trained as part of a larger network architecture trained based on multiple tasks that are distinct from the "semantic textual similarity" task for which the encoder model 130 can be used. In some of those implementations, the encoder model 130 is trained based on a task of predicting whether a textual response is a true response to a textual input (e.g., as described above) and is trained based on at least one additional task that is also distinct from the semantic textual similarity task.

One example of an additional task is a natural language inference task that can be trained using supervised training instances, such as supervised training instances from the Stanford Natural language Inference (SNLI) dataset. Such training instances each include a pair of textual segments as training instance input, along with training instance output that is a human label of one of multiple categories for the pair of textual segments (e.g., categories of: entailment, contradiction, and neutral). Additional network architecture components that can be utilized for the natural language inference task can include a feed-forward neural network model, such as a model with fully-connected layers and a softmax layer.

Figure 3:
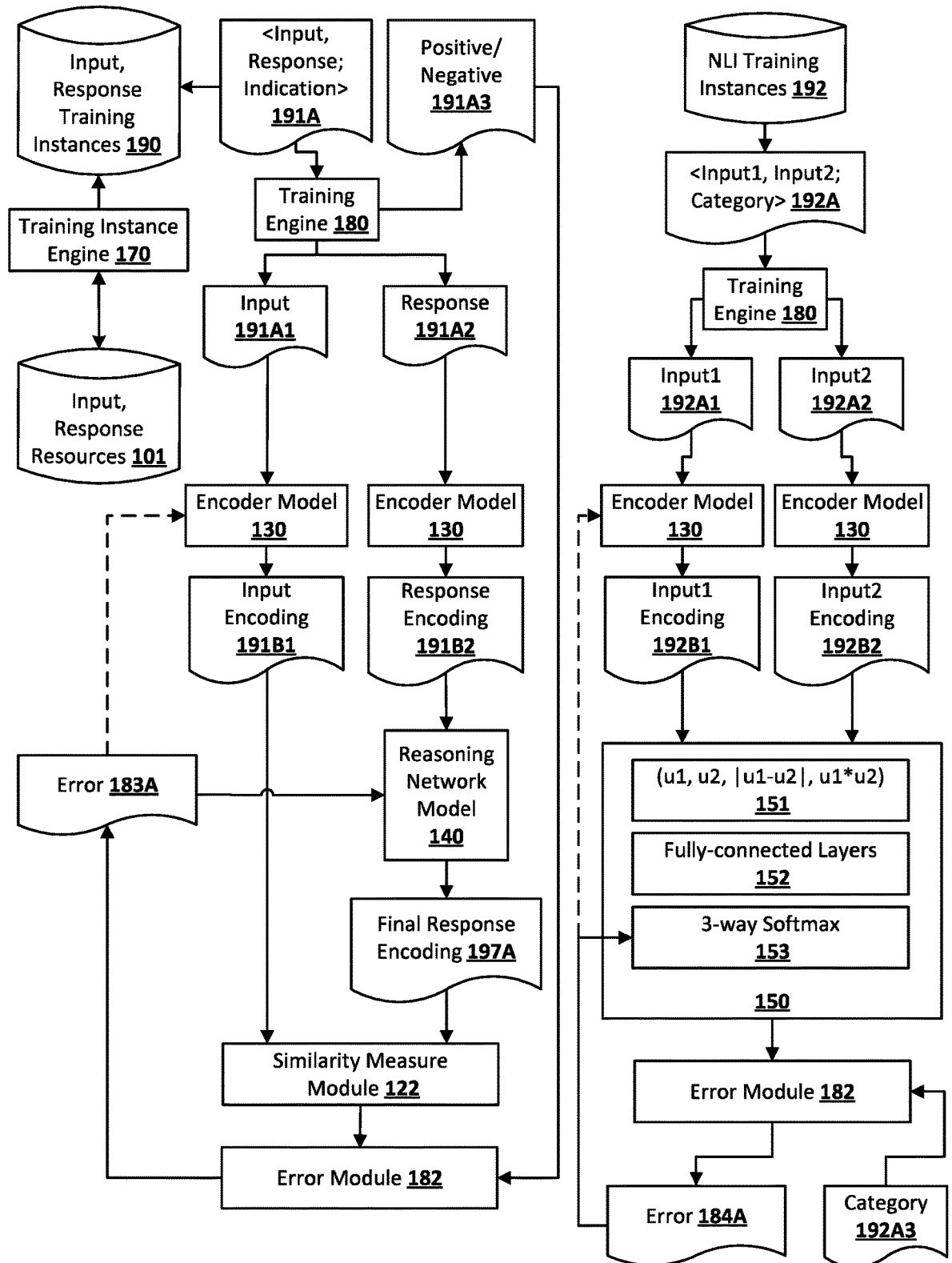
FIG. 3 illustrates another example of training an encoder model according to some implementations disclosed herein.

Turning now to FIG. 3, one example of training the encoder model 130 as part of training a larger network architecture based on multiple tasks is illustrated. In FIG. 3, the input, response training instances 190 are utilized to generate errors that are utilized to update the reasoning network model 140 and the encoder model 130, in the same manner as that described with respect to FIG. 1.

FIG. 3 further includes NLI training instances 192, which can include, for example, those from the SNLI dataset described above. The training engine 180 retrieves a training instance 192A from the NLI training instances 192. The training instance 192A includes training instance input of a first input 192A1 and second input 192A2, and training instance output 192A3 that indicates a label of a category of the first and second inputs (e.g., are they entailments of one another, contradictions of one another, or neutral).

The training engine 180 processes the first input 192A2 of the training instance 192A using the encoder model 130 to generate first input encoding 192B1. The training engine 180 also processes the second input 192A2 of the training instance 192A using the encoder model 130 to generate second input encoding 192B2. The encoder model 130 is illustrated four times in FIG. 3 to demonstrate that it is utilized for generating separate embeddings for training based on the input, response training instances 190, and generating separate embeddings based on the NLI training instances 192. However, it is understood that it is still only a single encoder model—that is trained based on errors determined for the two different tasks demonstrated by FIG. 3.

The training engine 180 processes the first input encoding 192B1 and second input encoding 192B2 using an additional model 150 to generate a prediction of the category of the inputs 192A1 and 192A2 of the training instance 192A. In particular, in FIG. 3 the training engine 180 constructs a feature vector 151 ($u_1$, $u_2$, $|u_1-u_2|$, $u_1*u_2$), where $u_1$ represents the first input encoding 192B1 and where $u_2$ represents the second input encoding 192B2. The feature vector is fed into a 3-way classifier that includes fully-connected layers 152 and a 3-way (for the three categories) softmax layer 153, to generate the prediction of the category.

The error module 182 determines an error 184A (if any) based on comparison of the predicted category to a labeled category 192A3 provided by the training engine 180 for the training instance 192A. The error module 182 then updates both the additional model 150 and the encoder model 130 based on the error 184A (and optionally based on other error(s) determined for a batch of training instances from NLI training instances 192, when batch learning is utilized and the training instance 192A of FIG. 3 is part of the batch). For example, the error module 182 may perform, based on the error and a loss function, backpropagation over the additional model 150 and the encoder model 130.

Although FIG. 3 is illustrated with respect to a single training instance 192A, it is understood that during training a large quantity of training instances from NLI training instances 192 will be utilized in training.

Through training based on FIG. 3, the encoder model 130 is updated based on errors determined based on the input, response training instances 190—and based on errors determined based on the NLI training instances 192. The encoder model 130 can be trained on these distinct tasks at the same time. In other words, the encoder model 130 is not first trained based on the input, response training instances 190, then trained on the NLI training instance 192 after completion of being trained on the input, response training instances 190. Rather, one or more updates (e.g., through one or more backpropagations of error) of weights of the encoder model 130 can be based on the input, response training instances 190, then one or more updates of weights of the encoder model 130 can be based on the NLI training instance 192, then one or more updates of weights of the encoder model 130 can be based on the input, response training instances 190, then one or more updates of weights of the encoder model can be based on the NLI training instance 192, etc. In some of those various implementations, independent workers (computer jobs) can be utilized in training, and each worker can train on only a corresponding task, utilizing batches of training instances for the corresponding task. Different quantities of workers can be devoted to the tasks, thereby adjusting the impact of each task in training of the encoder model 130.

Figure 4:
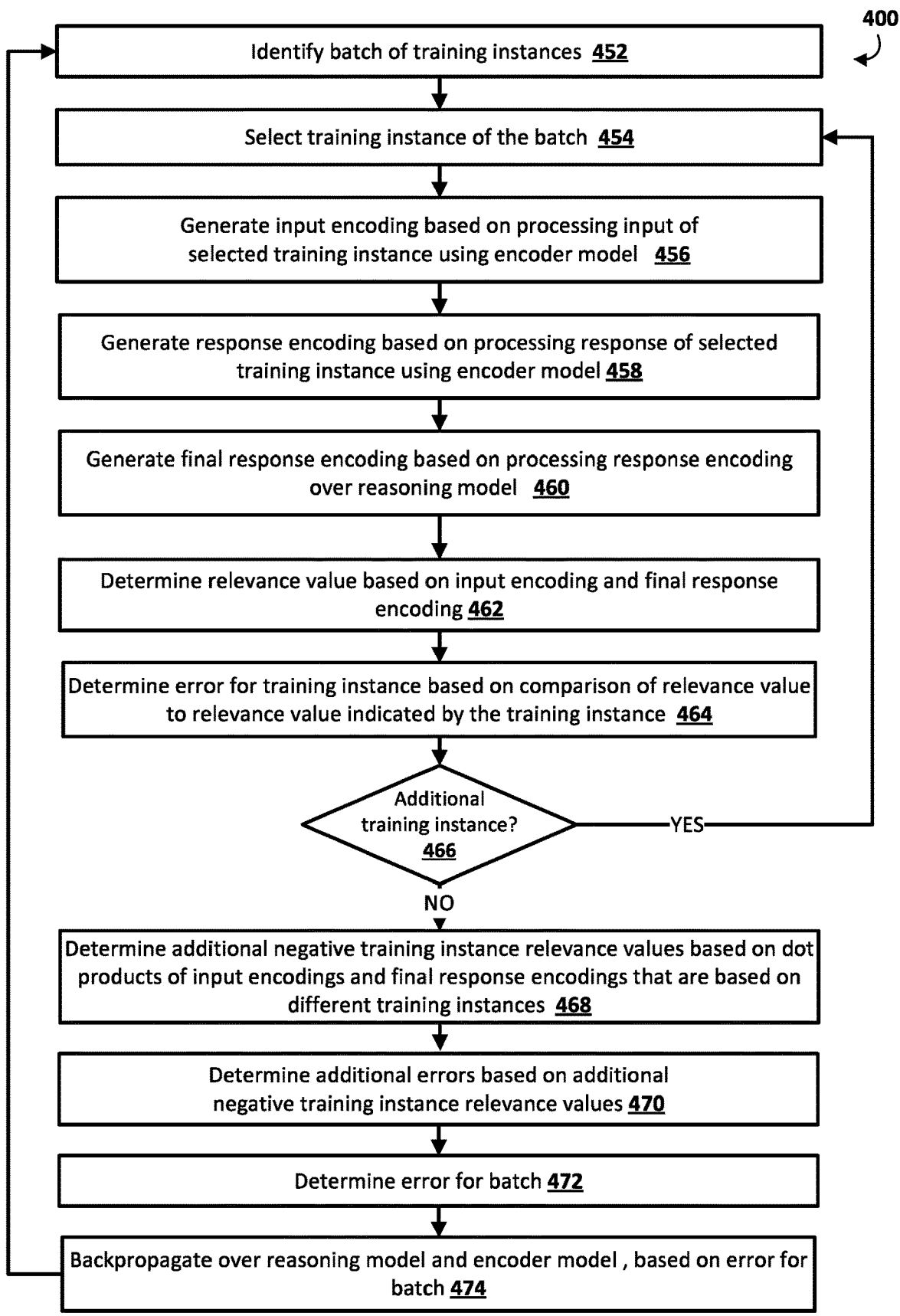
FIG. 4 is a flowchart illustrating an example method of training an encoder model according to some implementations disclosed herein.

Turning now to FIG. 4, a flowchart is provided that illustrates a method 400 of training an encoder model according to various implementations disclosed herein. For convenience, the operations of the flow chart are described with reference to a system that performs the operations. This system may include one or more components, such as one or more processors (e.g., CPU(s), GPU(s), and/or TPU(s)). While operations of method 400 are shown in a particular order, this is not meant to be limiting. One or more operations may be reordered, omitted or added.

At block 452, the system identifies a batch of training instances. For example, each of the training instances may be a training instance with an input, response, and an indication of whether the instance is a positive or negative instance (e.g., whether the response is a "true" response to the input).

At block 454, the system selects a training instance of the batch.

At block 456, the system generates an input encoding based on processing an input of the selected training instance using the encoder model.

At block 458, the system generates a response encoding based on processing a response of the selected training instance using the encoder model.

At block 460, the system generates a final response encoding based on processing the response encoding in block 458 over a reasoning model.

At block 462, the system determines a relevance value based on the input encoding in block 456 and the final response encoding in block 460.

At block 464, the system determines an error for the training instance based on comparison of the relevance value in block 462 to a relevance value indicated by the training instance. For example, where the training instance is a positive training instance, the response score indicated by the training instance may be "1" or other "positive" value.

At block 464, the system determines whether there are any additional unprocessed training instances in the batch. If so, the system proceeds to block 454 and selects an additional training instance. The system then performs blocks 456, 458, 460, 462, and 464 based on the additional training instance.

If, at an iteration of block 466, the system determines there are not any additional unprocessed training instances in the batch, the system proceeds to block 468.

At block 468, the system determines additional negative response scores based on dot products of input encodings and final response encodings that are based on different training instances. For example, the system can determine an additional negative response score based on a dot product of an input encoding generated at block 456 based on a first training instance and a final response encoding generated at block 460 based on a different second training instance. By using an input encoding and a final response encoding generated based on two different training instances, it can be assumed that the corresponding input and response are not based on an "actual" input, response pair. Accordingly, it can be assumed that the additional response scores generated at block 468 are additional "negative" response scores (i.e., generated on an effective "negative" training instance). Performance of block 468 effectively provides additional negative training instances, while enabling the reuse of previously generated input encodings and final response encodings. In other words, additional negative training instances are effectively obtained without requiring computationally intensive generation of further input encodings and final response encodings.

As one particular example, assume the batch of block 452 consists of 100 positive training instances. After training based on the 100 positive training instances, 100 input encodings and 100 final response encodings have been generated. A first "negative" relevance value can be generated based on the dot product of a first input encoding for a first training instance and a second final response encoding of a second training instance. A second "negative" relevance value can be generated based on the dot product of the first input encoding and a third final response encoding of a third training instance. Additional "negative" relevance values can be determined based on dot products of the first input encoding and the final response encoding for the fourth through one hundredth training instances. Further, 99 "negative" relevance values can be similarly determined based on the input encoding for the second training instance, and the final response encoding of the other training instances (those that are not the second training instance); 99 "negative" relevance values ban be similarly determined based on the input encoding for the third training instance, and the final response encoding of the other training instances (those that are not the third training instance); etc. Accordingly, 9,900 "negative" relevance values can be generated through relatively computationally efficient dot product calculations of encodings already generated based on the positive training instances. Further, an overall error can be determined (at block 472 below) that is based on a function of all of the "negative" relevance values (e.g., a softmax function) and the overall error backpropagated (at block 474) over the input encoder model and the response encoder model.

At block 470, the system determines additional errors based on the additional negative response scores determined at block 468. In particular, because the response scores determined at block 468 are considered to be for additional negative instances, the system determines the additional errors based on comparison of the negative response scores of block 468 to a "0" or other "negative" value.

At block 472, the system determines an error for the batch. The error for the batch can be based on the errors determined at iterations of block 464 and block 470.

At block 474, the system backpropogates over the encoder model and reasoning model based on the error for the batch.

The system may then identify a new batch of training instances, and restart method 400 for the new batch. Such training may continue until one or more criteria are satisfied. Although FIG. 4 illustrates a particular batch training approach, it is understood that non-batch training may additionally or alternatively be utilized in training. Also, in some implementations blocks 468 and 470 may be omitted and/or other blocks may be omitted or added. Also, although FIG. 4 shows training based on a single task, multi-task training can also be utilized, as described herein.

Figure 5:
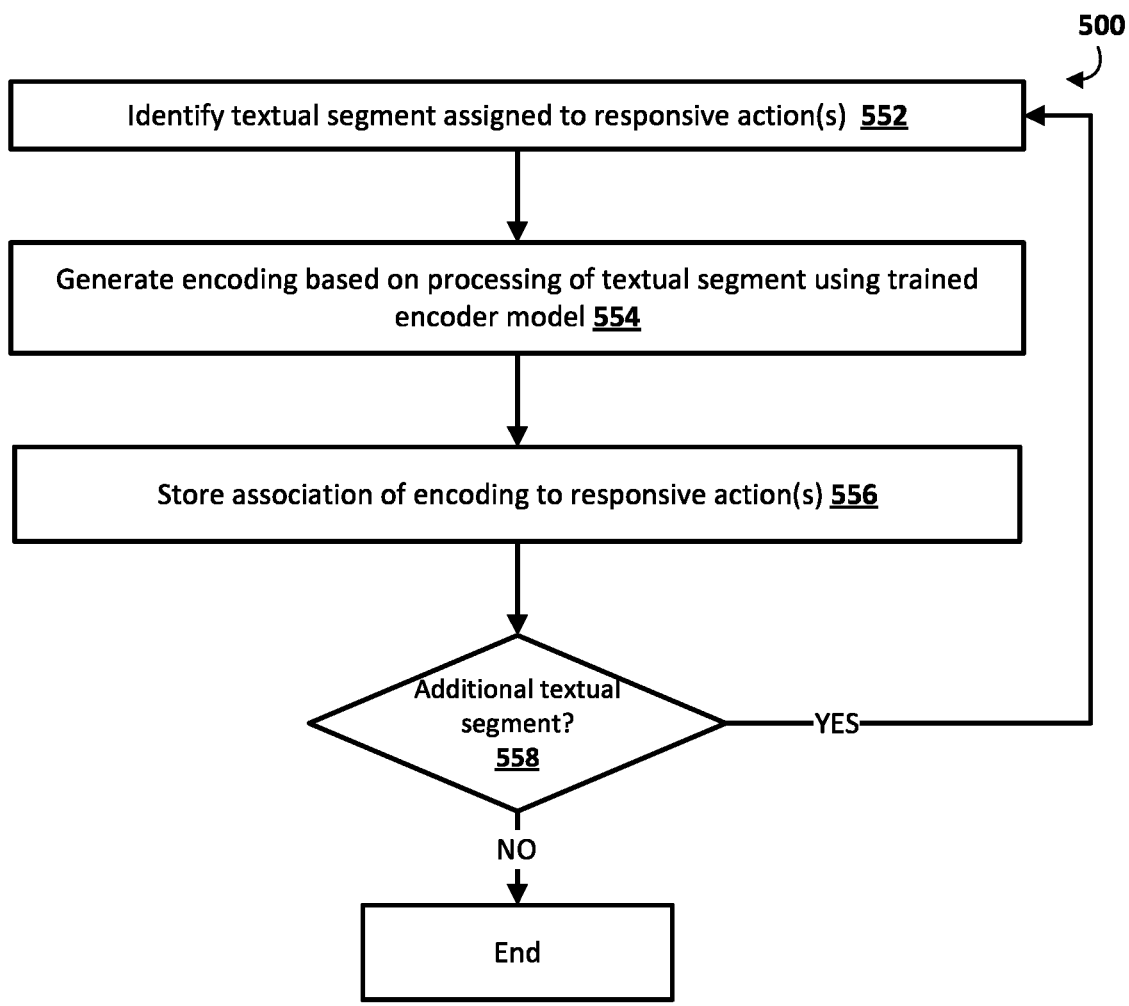
FIG. 5 is a flowchart illustrating an example method of generating encodings for textual segments assigned to responsive actions.

Turning now to FIG. 5, a flowchart is provided that illustrates a method 500 of generating encodings for textual segments assigned to responsive actions according to various implementations disclosed herein. For convenience, the operations of the flow chart are described with reference to a system that performs the operations. This system may include one or more components, such as one or more processors (e.g., CPU(s), GPU(s), and/or TPU(s)). While operations of method 500 are shown in a particular order, this is not meant to be limiting. One or more operations may be reordered, omitted or added.

At block 552, the system identifies a textual segment assigned to responsive action(s), such as a textual segment assigned to an automated assistant responsive action.

At block 554, the system generates an encoding based on processing of the textual segment using the trained encoder model.

At block 556, the system stores an association of the encoding to the responsive action(s).

At block 558, the system determines whether there is an additional textual segment. If so, the system proceeds to block 552 and identifies the additional textual segment. The additional textual segment can be assigned to the same responsive action, or another responsive action. The system then performs blocks 554 and 556 based on the additional textual segment.

If, at an iteration of block 558, the system determines there is not an additional textual segment, the system ends the method 500. Through multiple iterations of blocks 552, 554, and 556, multiple encodings for multiple textual segments can be generated, and multiple associations of encodings to corresponding responsive action(s) stored. For example, multiple encodings for multiple textual segments can be stored in association with a first automated assistant responsive action, multiple encodings for multiple textual segments can be stored in association with a second automated assistant responsive action, etc.

Figure 6:
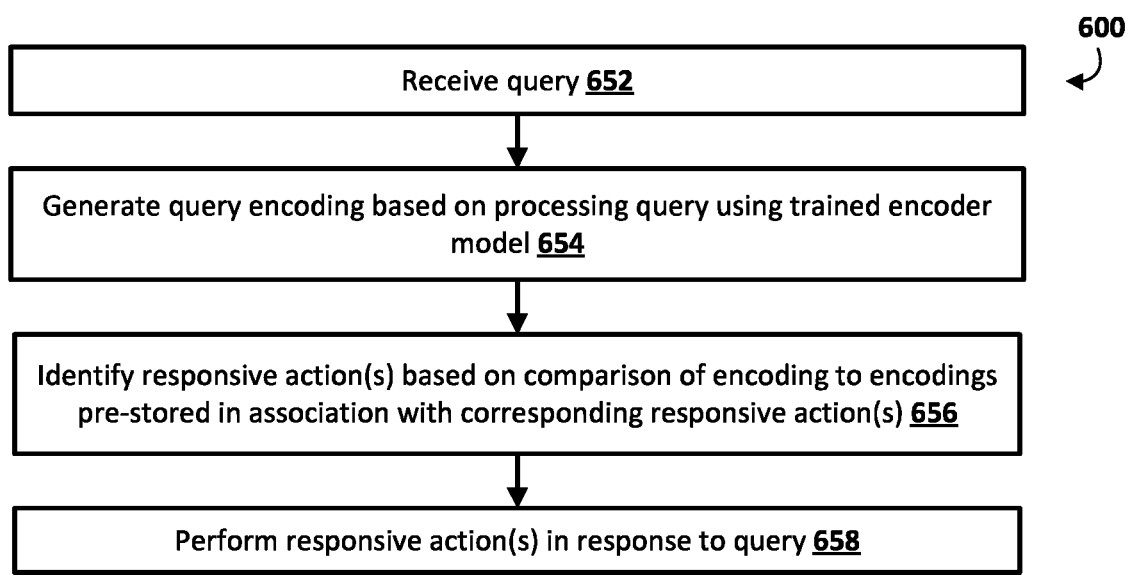
FIG. 6 is a flowchart illustrating an example method of using a trained encoder model to determine one or more responsive actions to perform in response to a natural language query.

Turning now to FIG. 6, a flowchart is provided that illustrates a method 600 of using a trained encoder model to determine one or more responsive actions to perform in response to a natural language query according to various implementations disclosed herein. For convenience, the operations of the flow chart are described with reference to a system that performs the operations. This system may include one or more components, such as one or more processors (e.g., CPU(s), GPU(s), and/or TPU(s)). While operations of method 600 are shown in a particular order, this is not meant to be limiting. One or more operations may be reordered, omitted or added.

At block 652, the system receives a query. The query can be provided, for example, as a spoken utterance or as a typed query.

At block 654, the system generates a query encoding based on processing of the query using the trained encoder model. For example, where the query is a spoken utterance, speech-to-text processing of audio data capturing the spoken utterance can be performed, and generated text can be processed, using the trained encoder model, to generate the query encoding. Also, for example, where the query is a typed query, the text of the typed query can be processed, using the trained encoder model, to generate the query encoding.

At block 656, the system identifies responsive action(s) based on comparison of the encoding generated in block 654 to encodings pre-stored in association with corresponding responsive action(s). For example, the system can identify the responsive action that has a pre-stored encoding that is closest, distance-wise in embedding space, to the encoding generated in block 654. In some implementations, the system identifies the responsive action based on its pre-stored encoding being closest to the encoding generated in block 654, and based on the pre-stored encoding satisfying a closeness threshold relative to the encoding generated in block 654.

At block 658, the system performs responsive action(s) in response to the received query.

Figure 7:
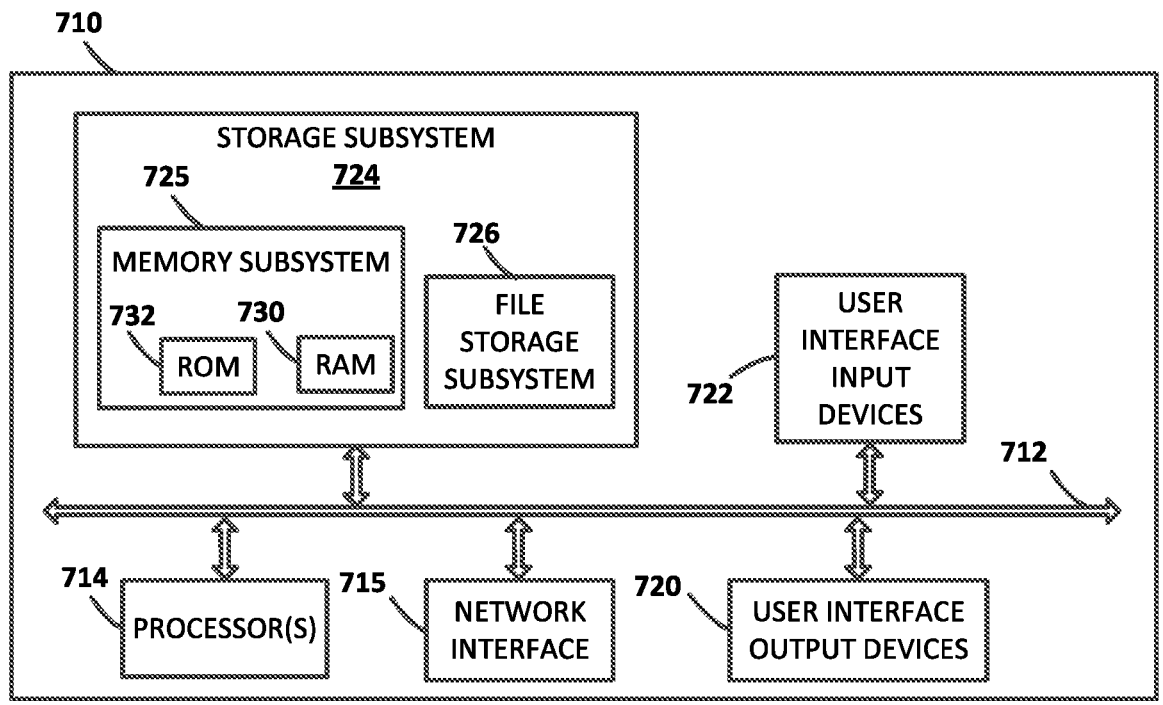
FIG. 7 illustrates an example architecture of a computing device.

FIG. 7 is a block diagram of an example computing device 710 that may optionally be utilized to perform one or more aspects of techniques described herein. The computing device 710 includes at least one processor 714 (e.g., a CPU, GPU, and/or TPU), which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 715. The input devices 722 and output devices 720 allow user interaction with the computing device 710. The network interface subsystem 715 provides an interface to outside networks and is coupled to corresponding interface devices in other computing devices.

The user interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the computing device 710 or onto a communication network.

The user interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a regular image. The display subsystem may also provide non-visual display such as via audio output devices. In general, use of the term "output device" is intended to include all possible types of devices and ways to output information from the computing device 710 to the user or to another machine or computing device.

The storage subsystem 724 stores programming and data constructs that provide the functionality of some or all of the modules described herein. For example, the storage subsystem 724 may include the logic to perform selected aspects of the methods described herein.

These software modules are generally executed by the processor 714 alone or in combination with other processors. Memory subsystem 725 used in the storage subsystem 724 can include a number of memories including a main random access memory (RAM) 730 for storage of instructions and data during program execution and a read only memory (ROM) 732 in which fixed instructions are stored. The file storage subsystem 726 can provide persistent storage for program and data files, and may include a hard disk drive, a solid state drive, a floppy disk drive along with associated removable media, a CD-ROM drive, an optical drive, or removable media cartridges. The modules implementing the functionality of certain implementations may be stored by the file storage subsystem 726 in the storage subsystem 724, or in other machines accessible by the processor(s) 714.

The bus subsystem 712 provides a mechanism for letting the various components and subsystems of the computing device 710 communicate with each other as intended. Although the bus subsystem 712 is shown schematically as a single bus, alternative implementations of the bus subsystem may use multiple busses.

The computing device 710 can be of varying types including a workstation, server, computing cluster, blade server, server farm, or any other data processing system or computing device. Due to the ever-changing nature of computers and networks, the description of the computing device 710 depicted in FIG. 7 is intended only as a specific example for purposes of illustrating some implementations. Many other configurations of the computing device 710 are possible having more or fewer components than the computing device depicted in FIG. 7.

In some implementations, a method implemented by one or more processors is provided and includes identifying a plurality of positive training instances that each include an input and a response. For each of the positive training instances: the input is based on content of a corresponding electronic communication, and the reply is based on a corresponding responsive electronic communication that is responsive to the corresponding electronic communication. The method further includes training an encoder model based on the positive training instances. Training the encoder model based on a given instance of the positive training instances includes: generating an input encoding based on processing the input using the encoder model; generating a response encoding based on processing the response using the encoder model; generating a final response encoding based on processing the response encoding using a reasoning model; determining a value based on comparison of the input encoding and the final response encoding; and updating both the reasoning model and the encoder model based on comparison of the value to a given value indicated by the given instance.

These and other implementations of the technology disclosed herein can include one or more of the following features.

In some implementations, the method further includes training the encoder model based on a plurality of distinct additional training instances, where the plurality of distinct additional training instances are for a task that is distinct from the task of the plurality of positive training instances. Training the encoder model based on a given distinct instance of the distinct additional training instances can include: generating a first encoding based on processing a first input of the given distinct instance using the encoder model; generating a second encoding based on processing a second input of the given distinct instance using the encoder model; generating a prediction based on processing of the first encoding and the second encoding using an additional model, where the additional model is not utilized in training the encoder model based on the positive training instances; and updating both the additional model and the encoder model based on comparison of the prediction to a labeled output of the given distinct instance. The labeled output can indicate, for example, a particular category, of a plurality of potential categories, for a natural language inference task. Training the encoder model based on the plurality of distinct additional training instances can occur simultaneously with training the encoder model based on the positive training instances. Training the encoder model based on the plurality of distinct additional training instances can be by one or more first worker threads and training the encoder model based on the positive training instances is by one or more second worker threads.

In some implementations, the method further includes, after training the encoder model: using the trained encoder model, independent of the reasoning model, to determine a similarity value of two textual segments, where the similarity value indicates semantic similarity of the two textual segments. Using the trained encoder model to determine the similarity value of the two textual segments can include: receiving a query directed to an automated assistant; generating a query encoding based on processing the query using the trained encoder model; comparing the query encoding to a plurality of pre-determined query encodings each stored in association with one or more corresponding actions; determining, based on the comparing, a given predetermined query encoding to which the query encoding is most similar; and in response to the query and based on the given predetermined query encoding being most similar to the query encoding, causing the automated assistant to perform the one or more corresponding actions that are stored in association with the given predetermined query encoding. The method can further include determining that a distance, between the query encoding and the given predetermined query encoding, satisfies a closeness threshold, and causing the automated assistant to perform the one or more corresponding actions can be further in response to determining that the distance satisfies the closeness threshold. Comparing the query encoding to the plurality of pre-determined query encodings can include: generating a plurality of scalar values, each based on a corresponding dot product of the query encoding and a corresponding one of the given predetermined query encodings; and determining, based on the comparing, the given predetermined query encoding to which the query encoding is most similar can include: selecting the given predetermined query encoding based on the scalar value, that is based on the dot product of the query encoding and the given predetermined query encoding, being the minimal of the generated plurality of scalar values. The query can be one that is not explicitly mapped, by the automated assistant, to the one or more corresponding actions. The query can be based on user input received at a first computing device, and the one or more corresponding actions can include controlling one or more additional devices.

In some implementations, a method implemented by one or more processors, is provided and includes: simultaneously training an encoder model based on a plurality of first training instances tailored to a first task and based on a plurality of second training instances tailored to a second task. The first task is distinct from the second task, and the first task and the second task are distinct from a semantic textual similarity task. The method further includes, after training the encoder model: using the trained encoder model to determine semantic textual similarity of two textual segments.

In some implementations, a method implemented by one or more processors is provided and includes: receiving a query directed to an automated assistant; generating a query encoding based on processing the query using a trained encoder model; comparing the query encoding to a plurality of pre-determined query encodings each stored in association with one or more corresponding actions; determining, based on the comparing, a given predetermined query encoding to which the query encoding is most similar; and in response to the query and based on the given predetermined query encoding being most similar to the query encoding, causing the automated assistant to perform the one or more corresponding actions that are stored in association with the given predetermined query encoding.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
    identifying a plurality of positive training instances that each include an input and a response, wherein for each of the positive training instances:
        the input is based on content of a corresponding electronic communication, and
        the response is based on a corresponding responsive electronic communication that is responsive to the corresponding electronic communication;
    training an encoder model based on the positive training instances, wherein training the encoder model based on a given instance of the positive training instances comprises:
        generating an input encoding based on processing the input using the encoder model;
        generating a response encoding based on processing the response using the encoder model;
        generating a final response encoding based on processing the response encoding using a reasoning model;
        determining a value based on comparison of the input encoding and the final response encoding; and
        updating both the reasoning model and the encoder model based on comparison of the value to a given value indicated by the given instance; and
    after training the encoder model:
        using the trained encoder model, independent of the reasoning model, to determine a similarity value of two textual segments, wherein the similarity value indicates semantic similarity of the two textual segments, and wherein using the trained encoder model to determine the similarity value of the two textual segments comprises:
        receiving a query directed to an automated assistant;
        generating a query encoding based on processing the query using the trained encoder model;
        comparing the query encoding to a plurality of pre-determined query encodings each stored in association with one or more corresponding actions;
        determining, based on the comparing, a given predetermined query encoding to which the query encoding is most similar; and
        in response to the query and based on the given predetermined query encoding being most similar to the query encoding, causing the automated assistant to perform the one or more corresponding actions that are stored in association with the given predetermined query encoding.

2. The method of claim 1, further comprising:
    training the encoder model based on a plurality of distinct additional training instances, wherein the plurality of distinct additional training instances are for a task that is distinct from the task of the plurality of positive training instances.

3. The method of claim 2, wherein training the encoder model based on a given distinct instance of the distinct additional training instances comprises:
- generating a first encoding based on processing a first input of the given distinct instance using the encoder model;
- generating a second encoding based on processing a second input of the given distinct instance using the encoder model;
- generating a prediction based on processing of the first encoding and the second encoding using an additional model, wherein the additional model is not utilized in training the encoder model based on the positive training instances; and
- updating both the additional model and the encoder model based on comparison of the prediction to a labeled output of the given distinct instance.

4. The method of claim 3, wherein the labeled output indicates a particular category, of a plurality of potential categories, for a natural language inference task.

5. The method of claim 3, wherein training the encoder model based on the plurality of distinct additional training instances occurs simultaneously with training the encoder model based on the positive training instances.

6. The method of claim 5, wherein training the encoder model based on the plurality of distinct additional training instances is by one or more first worker threads and wherein training the encoder model based on the positive training instances is by one or more second worker threads.

7. The method of claim 1, further comprising
- determining that a distance, between the query encoding and the given predetermined query encoding, satisfies a closeness threshold;
- wherein causing the automated assistant to perform the one or more corresponding actions is further in response to determining that the distance satisfies the closeness threshold.

8. The method of claim 1, wherein comparing the query encoding to the plurality of pre-determined query encodings comprises:
- generating a plurality of scalar values, each based on a corresponding dot product of the query encoding and a corresponding one of the plurality of pre-determined query encodings; and
- wherein determining, based on the comparing, the given predetermined query encoding to which the query encoding is most similar comprises: selecting the given predetermined query encoding based on a scalar value, that is based on the dot product of the query encoding and the given predetermined query encoding, being the minimal of the generated plurality of scalar values.

9. The method of claim 1, wherein the query is not explicitly mapped, by the automated assistant, to the one or more corresponding actions.

10. The method of claim 1, wherein the query is based on user input received at a first computing device, and wherein the one or more corresponding actions comprise controlling one or more additional devices.

11. The method of claim 1, wherein the query is received as a voice input, wherein the method further comprises performing a voice-to-text conversion process on the voice input to generate text, and wherein generating the query encoding based on processing the query using the trained encoder model comprises processing the text using the trained encoder model.

12. A method implemented by one or more processors, comprising:
- identifying a plurality of positive training instances that each include an input and a response, wherein for each of the positive training instances:
  - the input is based on content of a corresponding electronic communication, and
  - the response is based on a corresponding responsive electronic communication that is responsive to the corresponding electronic communication;
- training an encoder model based on the positive training instances, wherein training the encoder model based on a given instance of the positive training instances comprises:
  - generating an input encoding based on processing the input using the encoder model;
  - generating a response encoding based on processing the response using the encoder model;
  - generating a final response encoding based on processing the response encoding using a reasoning model;
  - determining a value based on comparison of the input encoding and the final response encoding; and
  - updating both the reasoning model and the encoder model based on comparison of the value to a given value indicated by the given instance; and
- training the encoder model based on a plurality of distinct additional training instances, wherein the plurality of distinct additional training instances are for a task that is distinct from the task of the plurality of positive training instances, and wherein training the encoder model based on a given distinct instance of the distinct additional training instances comprises:
  - generating a first encoding based on processing a first input of the given distinct instance using the encoder model;
  - generating a second encoding based on processing a second input of the given distinct instance using the encoder model;
  - generating a prediction based on processing of the first encoding and the second encoding using an additional model, wherein the additional model is not utilized in training the encoder model based on the positive training instances; and
  - updating both the additional model and the encoder model based on comparison of the prediction to a labeled output of the given distinct instance;
- after training the encoder model:
- using the trained encoder model, independent of the reasoning model, to determine a similarity value of two textual segments, wherein the similarity value indicates semantic similarity of the two textual segments.

13. The method of claim 12, wherein the labeled output indicates a particular category, of a plurality of potential categories, for a natural language inference task.

14. The method of claim 12, wherein training the encoder model based on the plurality of distinct additional training instances occurs simultaneously with training the encoder model based on the positive training instances.

15. The method of claim 14, wherein training the encoder model based on the plurality of distinct additional training instances is by one or more first worker threads and wherein training the encoder model based on the positive training instances is by one or more second worker threads.

* * * * *